(12) United States Patent
Schoen et al.

(10) Patent No.: US 7,762,527 B2
(45) Date of Patent: Jul. 27, 2010

(54) VACUUM VALVE

(75) Inventors: Mathias Schoen, Sevelen (CH); Didier Henry, Lustenau (AT)

(73) Assignee: VAT Holding AG, Haag (CH)

( * ) Notice: Subject to any disclaimer, the term of this patent is extended or adjusted under 35 U.S.C. 154(b) by 341 days.

(21) Appl. No.: 11/778,961

(22) Filed: Jul. 17, 2007

(65) Prior Publication Data
US 2008/0017822 A1  Jan. 24, 2008

(30) Foreign Application Priority Data
Jul. 19, 2006  (AT) .............................. A 1225/2006

(51) Int. Cl.
*F16K 25/00* (2006.01)
(52) U.S. Cl. .................. 251/193; 251/175; 251/197
(58) Field of Classification Search .................. 251/175, 251/193, 195, 197, 199, 200, 326
See application file for complete search history.

(56) References Cited

U.S. PATENT DOCUMENTS

| 3,776,394 | A |   | 12/1973 | Miller |
| 5,975,492 | A | * | 11/1999 | Brenes ........................ 251/175 |
| 6,056,266 | A | * | 5/2000  | Blecha ........................ 251/158 |
| 6,416,037 | B1 |  | 7/2002  | Geiser |
| 6,431,518 | B1 |  | 8/2002  | Geiser |
| 6,561,483 | B2 |  | 5/2003  | Nakagawa |
| 6,561,484 | B2 |  | 5/2003  | Nakagawa et al. |
| 6,854,708 | B2 |  | 2/2005  | Contin et al. |
| 6,899,316 | B2 |  | 5/2005  | Duelli |
| 7,413,162 | B2 | * | 8/2008 | Geiser ........................ 251/175 |
| 2004/0079915 | A1 |  | 4/2004 | Contin et al. |

FOREIGN PATENT DOCUMENTS

EP  1 063 457  5/2006

* cited by examiner

*Primary Examiner*—John K Fristoe, Jr.
(74) *Attorney, Agent, or Firm*—Frommer Lawrence & Haug LLP

(57) ABSTRACT

A vacuum valve comprises a valve body with a valve opening, a valve plate which is adjustable from an open position, in which it releases the valve opening, to an intermediate position, in which it covers the valve opening but is lifted from the valve seat, into a closed position in which it contacts the valve seat, and from the closed position to the intermediate position into the open position, a valve rod carrying the valve plate, a transverse drive unit by which the valve plate can be displaced in a transverse adjusting direction extending transverse to the longitudinal axis of the valve opening, a longitudinal drive unit by which the valve plate can be displaced in a longitudinal adjusting direction extending parallel to the longitudinal axis of the valve opening and opposite the longitudinal adjusting direction, and a guide device by which the transverse drive unit is guided so as to be displaceable relative to the valve body parallel to the longitudinal adjusting direction. The transverse drive unit is displaced relative to the valve body parallel to the longitudinal adjusting direction when the valve plate is adjusted from its intermediate position to its closed position and from its closed position to its intermediate position.

17 Claims, 5 Drawing Sheets

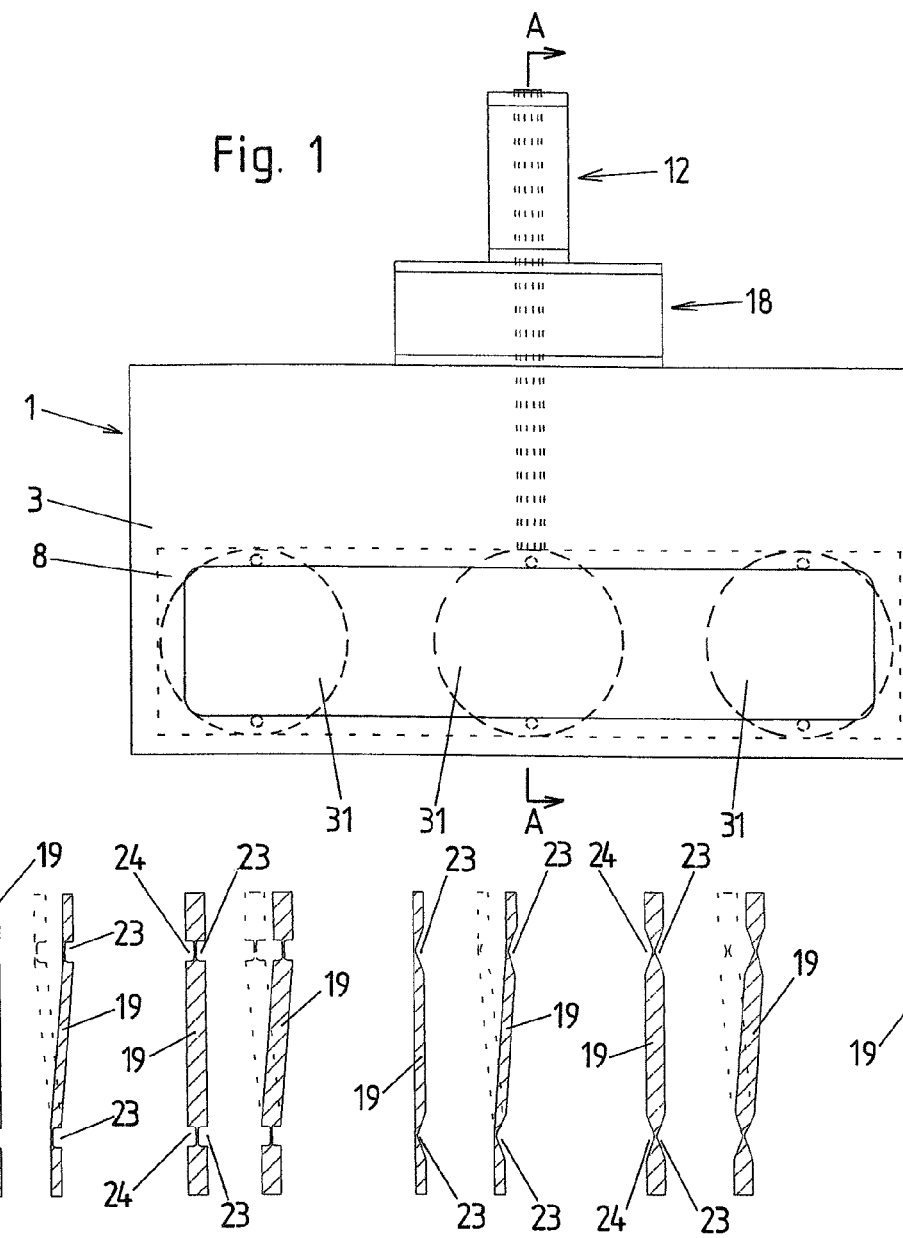
Fig. 1
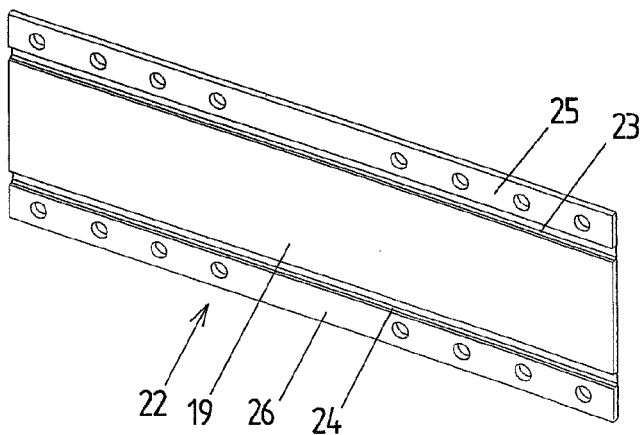
Fig.6 Fig.7 Fig.8 Fig.9 Fig.10 Fig.11 Fig.12 Fig.13 Fig.14 Fig.15
Fig. 5

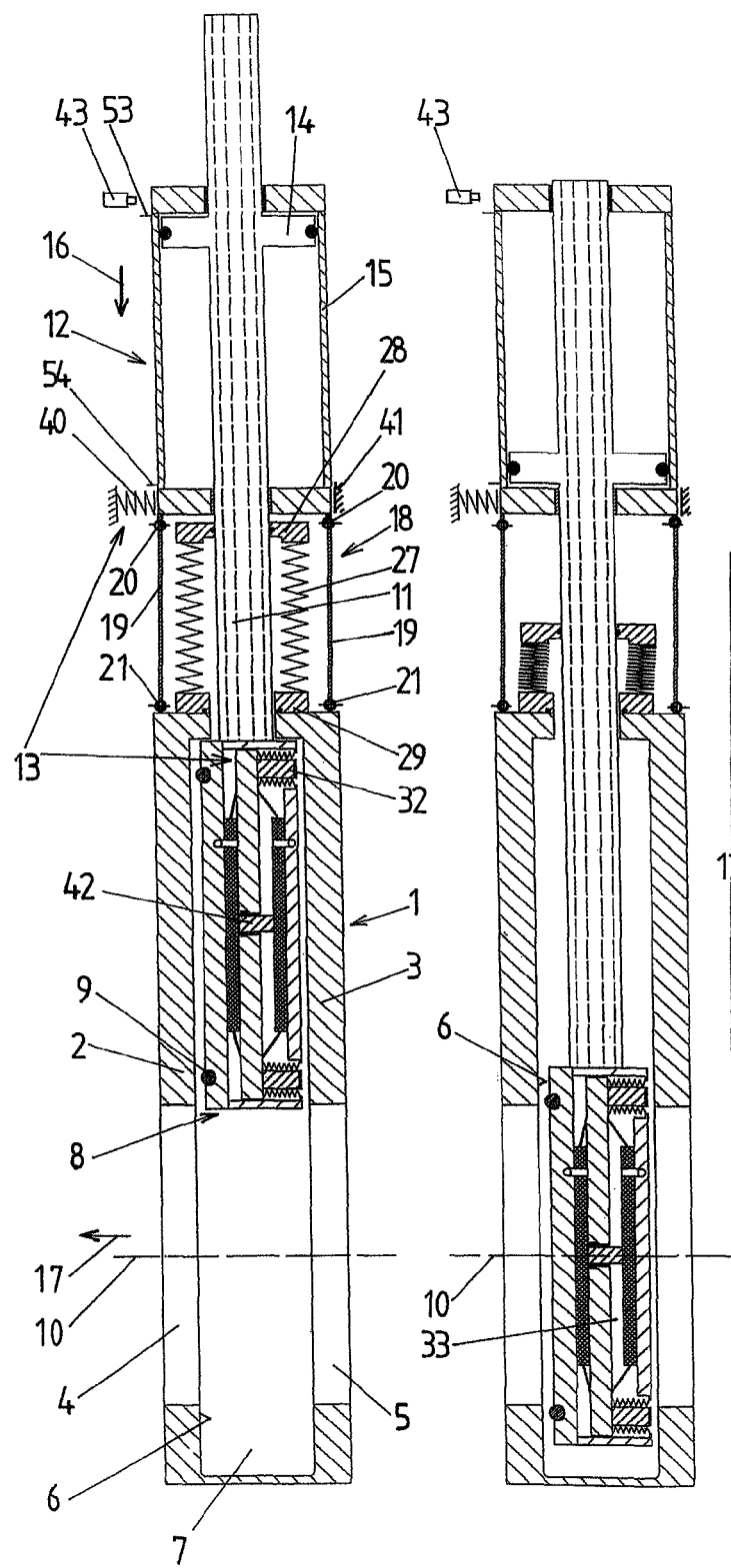

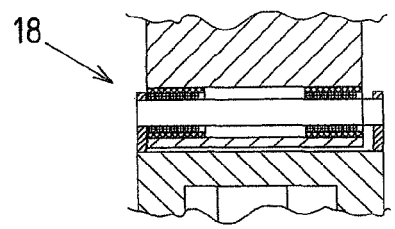
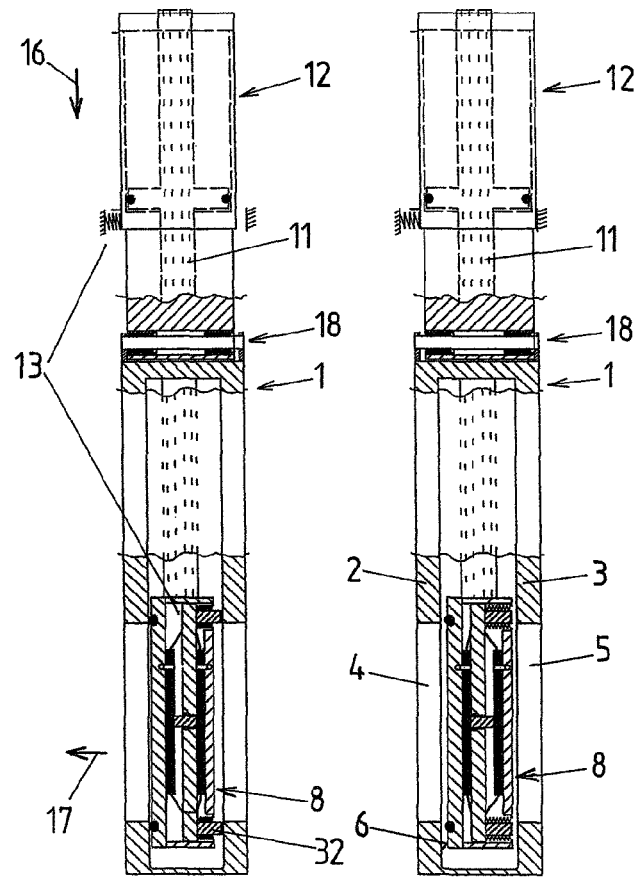
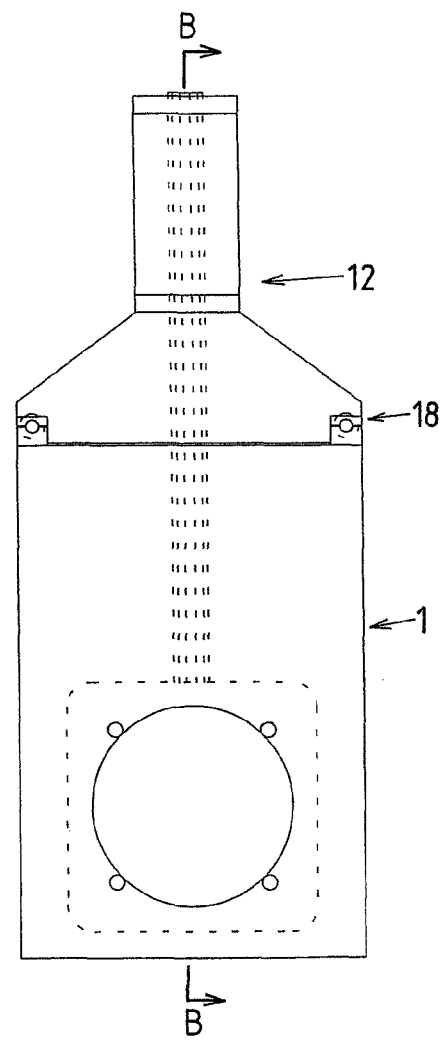
Fig. 29
Fig. 27  Fig. 28  Fig. 30

VACUUM VALVE

CROSS-REFERENCE TO RELATED APPLICATION

This application claims priority of Austrian Application No. A 1225/2006, filed Jul. 19, 2006, the complete disclosure of which is hereby incorporated by reference.

BACKGROUND OF THE INVENTION a) Field of the Invention

The invention is directed to a vacuum valve comprising a valve body with a valve opening having a longitudinal axis and a valve seat surrounding the valve opening, a valve plate which is adjustable from an open position, in which it releases the valve opening, to an intermediate position, in which it covers the valve opening but is lifted from the valve seat, into a closed position in which it contacts the valve seat, and from the closed position to the intermediate position into the open position, a valve rod carrying the valve plate, a transverse drive unit by means of which the valve plate can be displaced in a transverse adjusting direction extending transverse to the longitudinal axis of the valve opening from its open position into its intermediate position and opposite the transverse adjusting direction from its intermediate position into its open position, and a longitudinal drive unit by means of which the valve plate can be displaced in a longitudinal adjusting direction extending parallel to the longitudinal axis of the valve opening from its intermediate position into its closed position and opposite the longitudinal adjusting direction from its closed position into its intermediate position.

b) Description of the Related Art

A valve of the kind mentioned above is known from US 2004/0079915 A1, for example. A carrying body is arranged at the valve rod that is displaceable in axial direction by the transverse drive unit, and the longitudinal drive unit for pressing the valve plate against the valve seat is arranged at the carrying body. In one embodiment form, a supporting plate is held at the carrying body on the opposite side of the valve plate and can be pressed against the inner wall of the valve body by piston-cylinder units in order to absorb the reaction force of the valve plate. This construction is relatively complicated, and therefore costly, and results in a relatively large construction. In another embodiment form, the contact pressing plate can also be dispensed with and the reaction force of the valve plate must be absorbed by the valve rod or the valve rod must be correspondingly flexible so that the carrying body can be pressed against the inner wall of the valve body, which inner wall is located opposite from the valve seat.

Another valve of the type mentioned above is known from U.S. Pat. No. 6,561,484 B2. Either a carrying plate having a piston-cylinder unit, by means of which the valve plate is pressed against the valve body, is arranged at the valve rod, or the valve plate having a piston-cylinder unit by means of which a supporting plate is pressed against an inner wall of the valve body opposite from the valve seat is arranged at the valve rod. The valve plate is displaced relative to the valve seat. A similar vacuum valve is also known from U.S. Pat. No. 6,561,483 B2.

Other vacuum valves in which the valve plate is displaceable by piston-cylinder units relative to a carrying body arranged at the valve rod are known from U.S. Pat. Nos. 6,056,266 and 6,899,316 B2.

In the vacuum valve shown in U.S. Pat. No. 6,431,518 B1, the valve plate is arranged at a valve rod which is likewise adjustable by a piston-cylinder unit between a position in which the valve opening is released and a position in which the valve opening is covered but in which the valve plate is lifted from the valve seat. The cylinder of this piston-cylinder unit is swivelable around an axis oriented at right angles to the longitudinal axis of the valve rod and at right angles to the longitudinal axis of the valve opening. By swiveling this cylinder by means of another drive unit which can be constructed, for example, as a piston-cylinder unit, the valve plate is pressed against the valve seat.

U.S. Pat. No. 6,776,394 B2 shows a pendulum valve in which the valve plate is pressed against the valve seat in the closed position of the valve plate by means of tappets actuated by pistons which are mounted so as to be displaceable in cylindrical bore holes of the valve body.

OBJECT AND SUMMARY OF THE INVENTION

It is the primary object of the invention to provide a vacuum valve of the type mentioned above in which the valve plate can contact the valve seat without bending of the valve rod, but whose construction is simple, and in which a parallel contact of the valve plate against the valve seat is achieved.

According to the invention, this object is met by a vacuum valve comprising a valve body with a valve opening having a longitudinal axis and a valve seat surrounding the valve opening, a valve plate which is adjustable from an open position, in which it releases the valve opening, to an intermediate position, in which it covers the valve opening but is lifted from the valve seat, into a closed position in which it contacts the valve seat, and from the closed position to the intermediate position into the open position, a valve rod carrying the valve plate, a transverse drive unit by means of which the valve plate can be displaced in a transverse adjusting direction extending transverse to the longitudinal axis of the valve opening from its open position into its intermediate position and opposite the transverse adjusting direction from its intermediate position into its open position, a longitudinal drive unit by means of which the valve plate can be displaced in a longitudinal adjusting direction extending parallel to the longitudinal axis of the valve opening from its intermediate position into its closed position and opposite the longitudinal adjusting direction from its closed position into its intermediate position, and a guide device by means of which the transverse drive unit is guided so as to be displaceable relative to the valve body parallel to the longitudinal adjusting direction, wherein the transverse drive unit is displaced relative to the valve body parallel to the longitudinal adjusting direction when the valve plate is adjusted from its intermediate position to its closed position and from its closed position to its intermediate position.

By means of the construction according to the invention in which the transverse drive unit is guided so as to be displaceable relative to the valve body parallel to the longitudinal displacement direction, the valve plate can move toward the valve seat in an exactly parallel manner, the valve plate is extensively free from play, and a high torsional rigidity is achieved.

The vacuum valve according to the invention can have a simple and economical construction.

The design according to the invention makes for a space-saving construction.

Further, by detecting the position of the transverse drive unit in a vacuum valve according to the invention outside of the vacuum area, it can be determined whether the valve plate is in its closed position or in its intermediate position.

In an advantageous embodiment form of the invention, the guide device is designed as a parallelogram guide for displaceably guiding the transverse drive unit relative to the valve body.

A stop is preferably provided for the transverse drive unit, the transverse drive unit being pressed against the stop in the intermediate position of the valve plate by means of a contact pressing element, for example, by means of a spring element, and lifted from the stop in the closed position of the valve plate. This contact pressing element can serve to displace the valve plate from its closed position into its intermediate position.

In an advantageous embodiment form of the invention, the valve plate is arranged directly at the valve rod and has tappets which can be pressed by the piston-cylinder unit against an inner wall of the valve body, which inner wall is located opposite from the valve seat, in order to displace the valve plate from its intermediate position to its closed position and to press it against the valve seat.

Further advantages and details of the invention are described in the following with reference to the accompanying drawings which show further objects of the invention.

BRIEF DESCRIPTION OF THE DRAWINGS

In the drawings:

FIG. 1 shows a schematic view of an embodiment example of a vacuum valve according to the invention in the closed position of the valve plate;

FIG. 2 shows a schematic section along line A-A from FIG. 1;

FIG. 3 shows a section corresponding to FIG. 2, but in the intermediate position of the valve plate;

FIG. 4 shows a section corresponding to FIG. 2, but in the open position of the valve plate;

FIG. 5 shows an oblique view of a guide part for the displaceable guidance of the transverse drive unit;

FIG. 6 and FIG. 7 show cross sections through the guide part from FIG. 5 in a basic position and in a deflected position;

FIG. 8 and FIG. 9 show cross sections corresponding to FIG. 6 and FIG. 7 of a modified embodiment form of the guide part;

FIG. 10 and FIG. 11 show cross sections corresponding to FIG. 6 and FIG. 7 of another embodiment form of the guide part;

FIG. 12 and FIG. 13 show cross sections corresponding to FIG. 6 and FIG. 7 of another embodiment form of the guide part;

FIG. 14 and FIG. 15 show cross sections corresponding to FIG. 6 and FIG. 7 of another embodiment form of the guide part;

FIG. 20 shows an enlarged longitudinal center section through the tilting element of the feed-through;

FIGS. 21 to 23 show longitudinal center sections corresponding to FIGS. 17 to 19 of another modified feed-through;

FIGS. 27 and 28 show schematic sectional views of another embodiment form of a vacuum valve according to the invention in the open position and intermediate position of the valve plate (section line B-B from FIG. 30);

FIG. 29 shows an enlarged section of the vacuum valve in the area of the guide device for the transverse drive unit; and FIG. 30 shows a schematic view of the vacuum valve according to this embodiment form.

DESCRIPTION OF THE PREFERRED EMBODIMENT EXAMPLES

Figure 16:
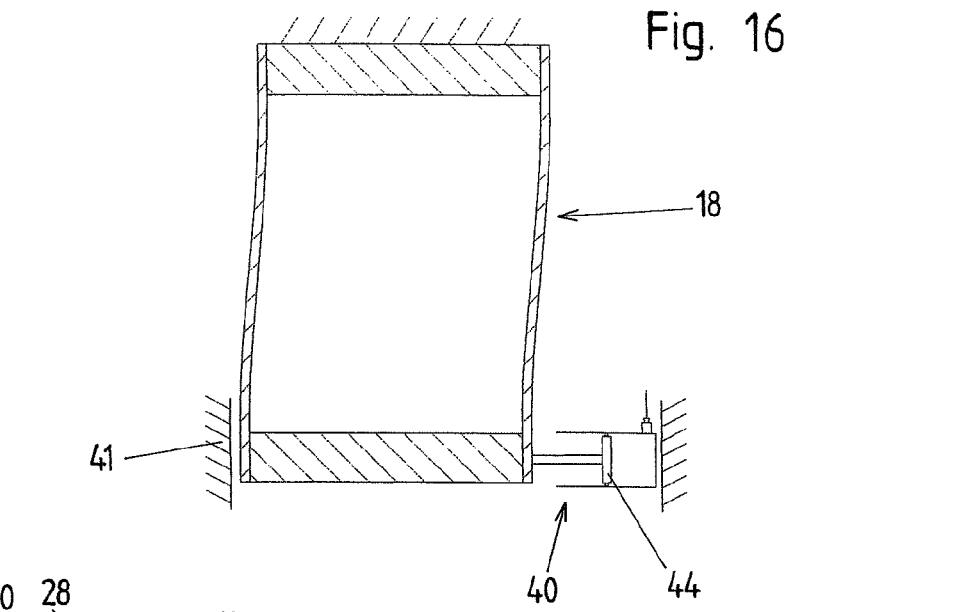
FIG. 16 shows a schematic section of a guide device for the transverse drive unit with a modified contact pressing element.

A first embodiment example of the invention is shown schematically in FIGS. 1 to 7. The vacuum valve has a valve body 1 which is constructed in the form of a housing in the present embodiment example. Opposite walls 2, 3 are penetrated by an inlet opening, which forms a valve opening 4, and by an outlet opening 5. The valve opening 4 is surrounded by a valve seat 6 which is formed by a sealing surface at the inner side of the wall 2.

In the present embodiment example, the longitudinal axis 10 of the valve opening and the longitudinal axis of the outlet opening 5 coincide in a preferred manner.

A valve plate 8 is arranged in the interior space 7 of the valve body 1 which forms a vacuum area of the vacuum valve. In the closed position of the valve plate 8, the valve plate 8 is pressed against the valve seat 6, and a seal 9 of the valve plate contacts the valve seat 6.

For example, the seal 9 could also be arranged at the valve seat 6 and a sealing surface could be provided at the valve plate 8 for cooperating with this seal.

In the open position of the valve plate 8 shown in FIG. 4, the valve plate 8 releases the valve opening 4. The closing of the vacuum valve is carried out starting from the open position of the valve plate 8 through an intermediate position shown in FIG. 3, in which the valve plate 8 covers the valve opening 4 (considered in direction of the longitudinal axis 10 of the valve opening 4) but is lifted from the valve seat 6. Conversely, when opening the vacuum valve, the valve plate 8 moves first from the closed position into the intermediate position and then into the open position.

The adjustment of the valve plate 8 between the open position and the intermediate position takes place transverse to, particularly at right angles to, the longitudinal axis 10 of the valve opening 4. The adjustment of the valve plate 8 between the intermediate position and the closed position is carried out parallel to the longitudinal axis 10 of the valve opening 4.

In the present embodiment example, the valve plate 8 is arranged directly at the end of a valve rod 11. To adjust the valve plate 8 between the open position and the intermediate position, the valve rod 11 is displaced in its axial direction and opposite to the transverse adjusting direction 16 by means of a transverse drive unit 12 located outside the vacuum area of the vacuum valve. The valve rod 11 lies parallel to the transverse adjusting direction 16. A longitudinal drive unit 13 serves to adjust the valve plate 8 between its intermediate position and its closed position and opposite to the longitudinal adjusting direction 17.

In the present embodiment example, the transverse drive unit 12 is formed by a piston-cylinder unit with a piston 14 at which the valve rod 11 is arranged and which is displaceable in a cylinder 15. For example, the piston 14 can be constructed as a dual-action piston. The use of a single-action piston in connection with spring loading of the piston in the other adjusting direction is also conceivable and possible. The piston 14 is acted upon by a gas under pressure, for example, compressed air or compressed nitrogen. Compressed air connections 53, 54 are indicated schematically in FIGS. 2 to 4.

Transverse drive units 12 formed in some other manner are also conceivable and possible. For example, an electric motor can also be used for driving.

The transverse drive unit 12 is guided by a guide device 18 so as to be displaceable relative to the valve body 1 parallel to the longitudinal adjusting direction. In the present embodiment example, the guide device 18 is constructed as a parallelogram guide. The guide device 18 has a plate-shaped guide part 19, respectively, on both sides of the valve rod, these plate-shaped guide parts 19 being connected to the cylinder 15 of the transverse drive unit 12 so as to be swivelable around a first axis 20 and connected to the valve body 1 so as to be swivelable around a second axis 21. The first axis 20 and second axis 21 lie at right angles to the transverse adjusting direction 16 and at right angles to the longitudinal adjusting direction 17. A plane penetrating the two first axes 20 and a plane penetrating the two second axes 21 lie at right angles to the transverse adjusting direction 16. The guide parts 19 lie parallel to one another.

The axes 20, 21 can be formed, for example, by foil hinges as is shown in FIGS. 5 to 7. For this purpose, a plate 22 has cross-sectional portions which are narrowed in diameter and which are formed, for example, by groove-like recesses 23, 24 on one side. The latter delimit the guide part 19 extending in the area between the recesses 23, 24 from fastening flanges 25, 26 which adjoin at both sides and by which the plate 22 is screwed to the cylinder 15 on one side and to the valve body 1 on the other side. The plate 22 can be formed, for example, from sheet metal, e.g., sheet aluminum. It would also be conceivable and possible to use plastic, e.g., fiber-reinforced plastic.

In this embodiment example, the valve rod 11 is sealed by bellows 27 and is guided out of the interior space 7 of the valve body 1 forming the vacuum area so as to be displaceable in the transverse adjusting direction 16 and in the longitudinal adjusting direction 17. End pieces 28, 29 of the bellows 27 are connected to the valve body 1 and to the valve rod 11, respectively, in a vacuum-tight manner.

In order to form the longitudinal drive unit 13, the valve plate 8 can be constructed, for example, like a housing and can have an interior space 30 in which at least one piston 31 is displaceable. Tappets 32 are arranged at the piston 31 and project out of the interior space 30 of the valve plate 8 through corresponding openings at least in the active position of the piston 31 (see FIG. 2). In this active position of the piston 31, the tappets 32 are supported at the inner side of the wall 3 located opposite from the valve seat 6 and press the valve plate 8 against the valve seat 6. However, in the passive position of the piston 31 (FIGS. 3 and 4), the tappets 32 are lifted from the wall 3.

The piston 31 could be sealed by a circumferential seal in the area of its circumference relative to the inner wall of a cylindrical bore hole of the valve plate 8. In the present embodiment example, diaphragm seals 35, 36 are provided for sealing work spaces 33, 34 as is shown schematically. These diaphragm seals 35, 36 have a rigid central portion, which contacts the respective inner wall of the valve plate 8, and a flexible edge portion which is arranged at the piston 31 in a sealed manner. The work spaces 33, 34 can be acted upon by gas under pressure, for example, compressed air or compressed nitrogen, by means of pressure gas channels 37, 38. The pressure gas channels 37, 38 extend through the valve rod 11, this portion of their extension being indicated by dashed lines in FIGS. 2 to 4.

The tappets 32 are preferably guided out of the interior space 30 in a sealed manner, for example, by means of diaphragms.

The central portions of the diaphragm seals 35, 36 are pressed by a pin 42 against walls of the valve plate 8 which define the interior space 30. The pin 42 can also serve for guiding the piston 31 in a displaceable manner.

Further, a contact pressing element 40 cooperating with the transverse drive unit 12 is provided outside the vacuum area. In the embodiment example according to FIGS. 1 to 7, the contact pressing element 40 is formed by a spring. In the passive position of the piston 31 (FIGS. 3 and 4), the contact pressing element 40 presses the transverse drive unit 12 against a stop 41 which is fixed with respect to the valve body.

When the vacuum valve is to be closed proceeding from the open position of the valve plate 8, the valve plate 8 is initially adjusted by means of the transverse drive unit 12 in the transverse adjusting direction 16 from its open position (FIG. 4) into its intermediate position (FIG. 3). In so doing, the piston 31 is in its passive position and the transverse drive unit 12 is pressed against the stop 41 by at least one contact pressing element 40. The piston 31 is then displaced in its active position and the tappets 32 come into contact with the inner side of the wall 3 and displace the valve plate 8, together with the valve rod 11 and the transverse drive unit 12, in the longitudinal adjusting direction 17. In so doing, the transverse drive unit 12 is lifted from the stop 41.

To open the vacuum valve, the piston 31 is adjusted to its passive position, wherein the at least one contact pressing element 40 displaces the transverse drive unit 12 and, together with the latter, the valve rod 11 and the valve plate 8 opposite to the longitudinal adjusting direction 17 until the transverse drive unit 12 contacts the stop 41. Accordingly, the intermediate position of the valve plate 8 is reached and the valve plate 8 is then displaced into its open position by the transverse drive unit 12.

At least one sensor 43 is preferably provided for detecting the position of the transverse drive unit 12, this at least one sensor 43 being arranged outside the vacuum area of the vacuum valve, and advantageously cooperates directly with the transverse drive unit 12. In the present embodiment example, a sensor 43 of the type mentioned above is provided and detects when the valve plate 8 is in its closed position as the cylinder 15 approaches the sensor 43. In the closed position of the valve plate 8, the transverse drive unit 12 may not be actuated.

FIGS. 8 to 15 show additional possibilities for connecting a plate-shaped guide part 19 to the transverse drive unit 12 and the valve body 1 so as to be swivelable or bendable around the axes 20, 21. In the embodiment example according to FIGS. 8 and 9 (shown in the unswiveled, displaced state), groove-like recesses 23, 24 are introduced at the plate 22 from both surfaces. In the embodiment forms shown in FIGS. 10 and 11 and FIGS. 12 and 13, the recesses 23, 24 are V-shaped (on one or both sides of the plate). In the embodiment form according to FIGS. 14 and 15, the guide part 19 is formed by a continuous, correspondingly flexible plate without recesses. Using two parallel guide parts 19 constructed in this form, a parallel guide is likewise achieved by forming bending locations in the guide parts 19.

FIG. 16 shows another possible construction of the contact pressing element 40. In this embodiment form, the contact pressing element 40 is constructed in the form of a piston-cylinder unit by means of which the transverse drive unit 12 can be pressed against the stop 41. The piston 44 is preferably again acted upon by a gas under pressure. The piston 44 is constructed as a single-action piston in this case.

Figure 17:
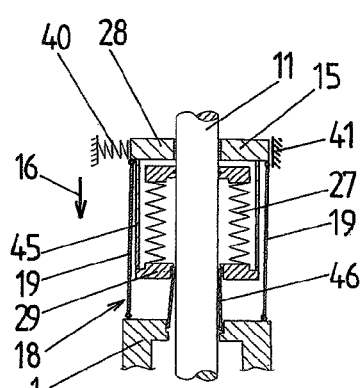
FIGS. 17 to 19 show schematic longitudinal center sections of a modified feed-through of the valve rod out of the vacuum area of the valve body in the open position, intermediate position and closed position of the valve plate.
Figure 18:
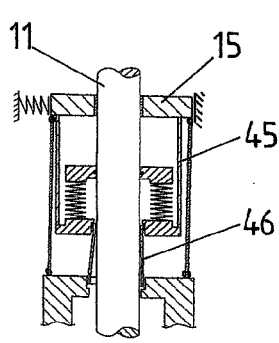
Figure 19:
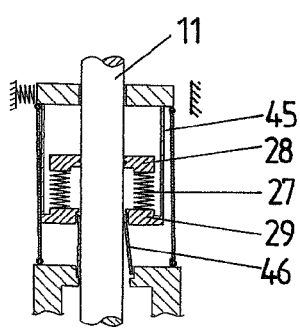

FIGS. 17 to 19 show another possible construction for guiding the valve rod 11 out of the vacuum area of the vacuum valve. An end piece 28 of the bellows 27 is arranged at the valve rod 11 in a vacuum-tight manner. The other end piece 29 of the bellows 27 is held by a fastening part 45 to the transverse drive unit 12 so as to be fixed with respect to displacement relative to the latter. The fastening part 45 can be sleeve-shaped, for example. A tilting element 46 having a conical shape extends between the end piece 29 and the valve body 1 and has outer circumferential sealing beads 47, 48 in both end portions. These sealing beads 47, 48 contact sealing surfaces of the end piece 29 and of the valve body 1. When the transverse drive unit 12 is displaced relative to the valve body 1 in the longitudinal adjusting direction 17, the tilting element 46 tilts around an axis extending at right angles to the longitudinal adjusting direction 17 and at right angles to the transverse adjusting direction 16.

Figure 21:
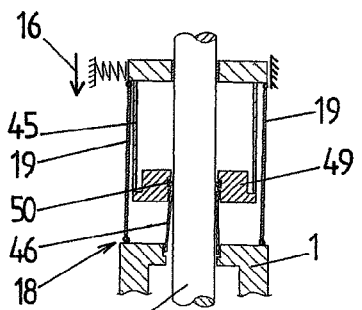
Figure 22:
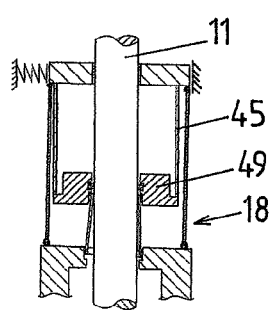
Figure 23:
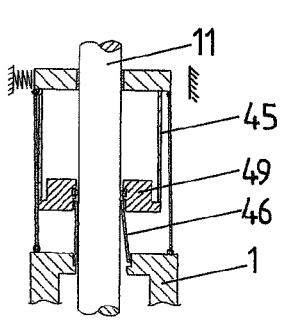
Figure 20:
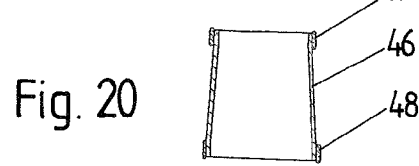

In the feed-through for the valve rod 11 shown in FIGS. 21 to 23, a sliding seal element 49 for the valve rod 11 replaces the bellows 27 used in the embodiment form shown in FIGS. 17 to 19. The valve rod 11 is sealed so as to be displaceable in axial direction relative to the sliding seal element 49 by means of a seal 50 of the sliding seal element 49 which contacts the valve rod 11 circumferentially. The sliding seal element 49 is connected in turn to the transverse drive unit 12 by a fastening part 45 and is displaceable in the longitudinal adjusting direction 17 relative to the valve body 1 by means of a tilting element 46. The vacuum area of the vacuum valve extends through the tilting element 46 to the sliding seal element 49.

Figure 24:
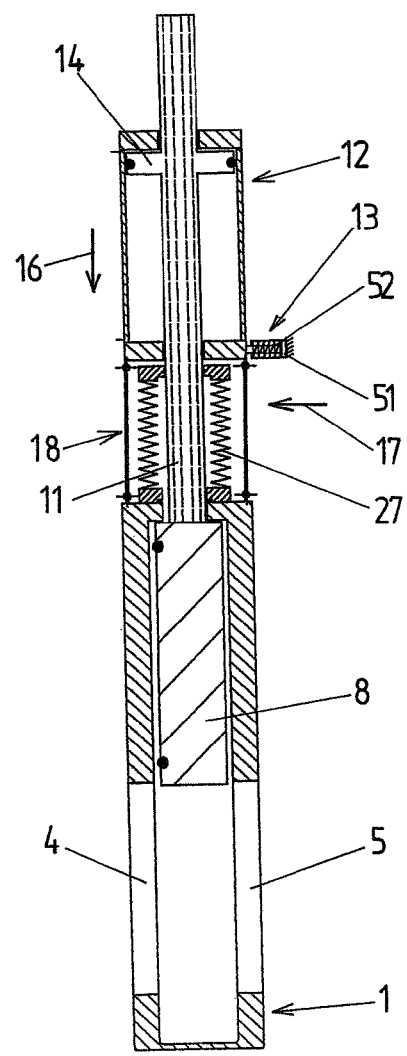
FIGS. 24 to 26 show schematic sectional views of another embodiment form of a vacuum valve according to the invention in the open position, intermediate position and closed position of the valve plate.
Figure 25:
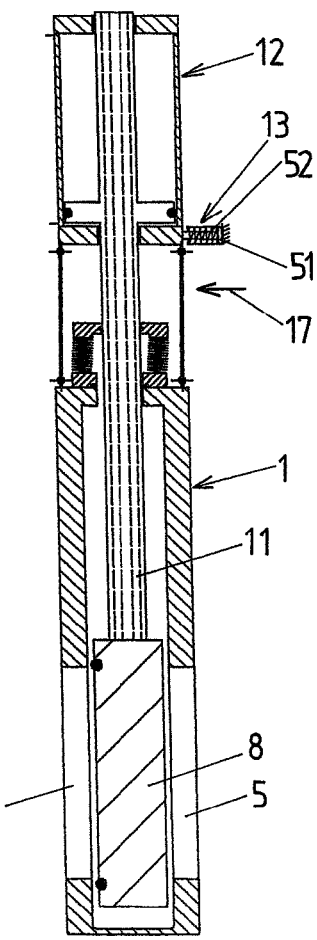
Figure 26:
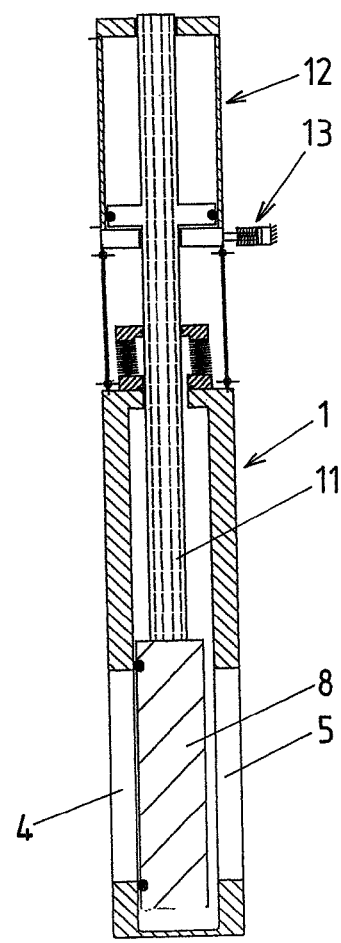

In the embodiment example according to FIGS. 24 to 26, the longitudinal drive unit 13 is arranged entirely outside of the vacuum area of the vacuum valve. The longitudinal drive unit 13 acts directly on the transverse drive unit 12 in order to displace the latter in the longitudinal adjusting direction 17 and opposite to the longitudinal adjusting direction 17 relative to the valve body 1. Accordingly, the valve rod 11 and, along with the latter, the valve plate 8 are also displaced in longitudinal adjusting direction 17.

In this case, the longitudinal drive unit 13 can be formed, for example, by a piston-cylinder unit. When the valve plate 8 has been adjusted to its intermediate position by the transverse drive unit 12, the valve plate 8 can be displaced by this piston-cylinder unit in the longitudinal adjusting direction 17 and moved into its closed position. This piston-cylinder unit also returns the valve plate 8 to the intermediate position from the closed position. As is shown in the drawing, the piston 51 of the piston-cylinder unit can be constructed, for example, as a single-action piston 51 which acts in the longitudinal adjusting direction 17. The opposite displacement of the piston is carried out by a spring 52. The use of a dual-action piston can also be provided. In a preferred manner, the piston is again acted upon by gas under pressure.

A construction of this kind is particularly suited to applications in which the valve plate 8 is acted upon only by a differential pressure which presses the valve plate 8 against the valve seat 6. Therefore, in the closed position of the valve plate 8, there is no need for a very high closing force to press the valve plate 8 against the valve seat 6. Vacuum valves which are designed only for a differential pressure acting in one direction are also referred to as "doors." Doors of this kind can be used, for example, to seal an opening in a wall of a vacuum chamber. Openings in pipelines can also be sealed by doors of this kind when the differential pressure acts only in one direction. Depending on the specific application, the valve body 1 need also not be constructed in the shape of a housing, and in particular the wall 3 and a sealed feed-through for the valve rod 11 can be dispensed with.

Another embodiment example of the invention is shown in FIGS. 27 to 30. In this embodiment example, the guide device 18 for displaceably guiding the transverse drive unit 12 relative to the valve body 1 is constructed in the form of a linear guide with recirculating ball bearings.

The guide device 18 could also be constructed in the form of a sliding guide, for example.

In another embodiment form of the invention, a housing-like carrying body which carries the valve plate so as to be adjustable in the longitudinal adjusting direction could also be arranged at the valve rod 11. The carrying body could be outfitted with a piston-cylinder unit forming the longitudinal drive unit, wherein the valve plate is fastened to a piston rod of this piston-cylinder unit or to tappets arranged at the piston. For example, the construction of the carrying body could basically be analogous to the construction of the valve plate shown in FIGS. 2 to 4, wherein the valve plate is fastened to the tappets 32. The valve opening would then be located in the wall 3 of the valve body 1 and the valve seat 6 would be arranged at the inner side of the wall 3 in the area surrounding the valve opening. When the valve plate contacts the valve seat while adjusting in the longitudinal adjusting direction, the carrying body is then displaced together with the valve rod 11 and the transverse drive unit 12 opposite to the adjusting direction until the carrying body can be supported at the valve body 1 for absorbing the reaction force.

As follows from the preceding description, the range of the invention is not limited to the embodiment examples shown herein, but rather should be defined with reference to the appended claims together with their full range of possible equivalents.

While the preceding description and drawings show the invention, it is obvious to a person skilled in the art that various modifications can be carried out without departing from the spirit of and field of the invention.

REFERENCE NUMBERS

1 valve body
2 wall
3 wall
4 valve opening
5 outlet opening
6 valve seat
7 interior space
8 valve plate
9 seal
10 longitudinal axis
11 valve rod
12 transverse drive unit
13 longitudinal drive unit
14 piston
15 cylinder
16 transverse adjusting direction
17 longitudinal adjusting direction
18 guide device
19 guide part
20 first axis
21 second axis
22 plate
23 recess
24 recess
25 fastening flange
26 fastening flange
27 bellows
28 end piece
29 end piece 30 interior space
31 piston
32 tappet
33 work space
34 work space
35 diaphragm seal
36 diaphragm seal
37 pressure gas channel
38 pressure gas channel
39 diaphragm
40 contact pressing element
41 stop
42 pin
43 sensor
44 piston
45 fastening part
46 tilting element
47 sealing bead
48 sealing bead
49 sliding seal element
50 seal
51 piston
52 spring
53 compressed air connection
54 compressed air connection

What is claimed is:

1. A vacuum valve comprising:
   a valve body with a valve opening having a longitudinal axis and a valve seat surrounding the valve opening;
   a valve plate which is adjustable from an open position, in which it releases the valve opening, to an intermediate position, in which it covers the valve opening but is lifted from the valve seat, into a closed position in which it contacts the valve seat, and from the closed position to the intermediate position into the open position;
   a valve rod carrying the valve plate;
   a transverse drive unit by which the valve plate can be displaced in a transverse adjusting direction extending transverse to the longitudinal axis of the valve opening from its open position into its intermediate position and opposite the transverse adjusting direction from its intermediate position into its open position;
   a longitudinal drive unit by which the valve plate can be displaced in a longitudinal adjusting direction extending parallel to the longitudinal axis of the valve opening from its intermediate position into its closed position and opposite the longitudinal adjusting direction from its closed position into its intermediate position;
   a guide device by which the transverse drive unit is guided so as to be displaceable relative to the valve body parallel to the longitudinal adjusting direction; and
   said transverse drive unit being displaced relative to the valve body parallel to the longitudinal adjusting direction when the valve plate is adjusted from its intermediate position to its closed position and from its closed position to its intermediate position.

2. The vacuum valve according to claim 1,
   wherein the transverse drive unit and the valve rod are displaced together with the valve plate in the longitudinal adjusting direction or opposite thereto when the valve plate is adjusted from its intermediate position to its closed position and from its closed position to its intermediate position.

3. The vacuum valve according to claim 1,
   wherein the guide device for displaceably guiding the transverse drive unit relative to the valve body is a parallelogram guide.

4. The vacuum valve according to claim 3,
   wherein the guide device has guide parts which are arranged at both sides of the valve rod so as to be swivelable or bendable around first axes and second axes oriented at right angles to the transverse adjusting direction and at right angles to the longitudinal adjusting direction, these guide parts being connected, respectively, to the valve body on one side and to the transverse drive unit on the other side.

5. The vacuum valve according to claim 4,
   wherein the guide parts are plate-shaped.

6. The vacuum valve according to claim 1,
   wherein the transverse drive unit has at least one piston-cylinder unit.

7. The vacuum valve according to claim 1,
   wherein the transverse drive unit is pressed against a stop in the intermediate position of the valve plate by a contact pressing element arranged outside a vacuum area of the vacuum valve and is lifted from the stop in the closed position of the valve plate.

8. The vacuum valve according to claim 7,
   wherein the contact pressing element is formed by at least one spring.

9. The vacuum valve according to claim 7,
   wherein the contact pressing element is formed by at least one piston-cylinder unit.

10. The vacuum valve according to claim 1,
    wherein the longitudinal drive unit comprises a piston arranged in an interior space of the valve plate.

11. The vacuum valve according to claim 1,
    wherein the longitudinal drive unit is arranged entirely outside a vacuum area of the vacuum valve and acts on the transverse drive unit.

12. The vacuum valve according to claim 1,
    wherein the valve plate is arranged in an interior space of the valve body, which interior space forms a vacuum area.

13. The vacuum valve according to claim 12,
    wherein the valve rod is sealed and is guided out of the interior space of the valve body forming the vacuum area so as to be displaceable in the transverse adjusting direction and longitudinal adjusting direction.

14. The vacuum valve according to claim 13,
    wherein bellows are provided for guiding the valve rod out of the interior space of the valve body in a sealed manner.

15. The vacuum valve according to claim 13,
    wherein a sliding seal element which is penetrated in a sealed manner by the valve rod is provided for guiding the valve rod out of the interior space of the valve body in a sealed manner, wherein the valve rod is displaceable axially relative to the sliding seal element, the sliding seal element being connected in a vacuum-tight manner to the valve body by a tilting element.

16. The vacuum valve according to claim 1,
    wherein at least one sensor is provided which is arranged outside of the vacuum area of the vacuum valve and detects the displacement position of the transverse drive unit.

17. The vacuum valve according to claim 1,
    wherein the valve plate is rigid connecting with the valve rod.

\* \* \* \* \*